(12) United States Patent
Ahmad et al.

(10) Patent No.: US 11,569,974 B2
(45) Date of Patent: *Jan. 31, 2023

(54) HYBRID FREQUENCY AND TIME DUPLEXING COMMUNICATIONS

(71) Applicant: Telefonaktiebolaget LM Ericsson (publ), Stockholm (SE)

(72) Inventors: Talha Ahmad, Kanata (CA); Scott Gibson, Ottawa (CA); Dongsheng Yu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/494,369

(22) Filed: Oct. 5, 2021

(65) Prior Publication Data

US 2022/0029775 A1 Jan. 27, 2022

Related U.S. Application Data

(63) Continuation of application No. 16/499,556, filed as application No. PCT/IB2017/058376 on Dec. 22, 2017, now Pat. No. 11,159,301.

(60) Provisional application No. 62/480,668, filed on Apr. 3, 2017.

(51) Int. Cl.
*H04L 5/14* (2006.01)
*H04L 1/00* (2006.01)
(Continued)

(52) U.S. Cl.
CPC .......... *H04L 5/1469* (2013.01); *H04L 1/0004* (2013.01); *H04L 1/1819* (2013.01);
(Continued)

(58) Field of Classification Search
CPC ... H04L 5/1469; H04L 1/0004; H04L 1/1819; H04L 5/0055; H04L 5/14; H04L 5/003;
(Continued)

(56) References Cited

U.S. PATENT DOCUMENTS

2002/0173277 A1* 11/2002 Takao .................. H04W 16/04
455/77
2005/0002349 A1 1/2005 Hayashi et al.
(Continued)

FOREIGN PATENT DOCUMENTS

| CN | 1538640 A | 10/2004 |
| CN | 101272175 A | 9/2008 |
| EP | 2 725 723 A1 | 4/2014 |

OTHER PUBLICATIONS

Chinese Office Action and English Summary of the Chinese Office Action dated Dec. 2, 2021 issued in corresponding Chinese Application No. 201780091562.3, consisting of 9 pages.
(Continued)

*Primary Examiner* — Thai Nguyen
(74) *Attorney, Agent, or Firm* — Christopher & Weisberg, P.A.

(57) ABSTRACT

A method, network node and wireless device configured for allocating resources for reverse link transmissions from a second network node to a first network node and forward link transmissions from the first network node to the second network node in a wireless communication system are disclosed. According to one aspect, the method includes selecting a per-band duplexing cadence for each of at least two frequency bands, a duplexing cadence defining a forward link/reverse link pattern of adjacent successive time slots. The method also includes allocating each of the at least two frequency bands to one of forward link and reverse link transmission in each of adjacent successive time slots according to the per-band duplexing cadence for the frequency band.

22 Claims, 10 Drawing Sheets

(51) Int. Cl.
    *H04L 1/18*    (2006.01)
    *H04L 5/00*    (2006.01)
    *H04W 72/02*   (2009.01)
    *H04W 72/04*   (2009.01)
    *H04W 92/18*   (2009.01)

(52) U.S. Cl.
    CPC ........... *H04L 5/0055* (2013.01); *H04W 72/02* (2013.01); *H04W 72/0446* (2013.01); *H04W 72/0453* (2013.01); *H04W 92/18* (2013.01)

(58) Field of Classification Search
    CPC ................ H04L 5/0094; H04W 72/02; H04W 72/0446; H04W 72/0453; H04W 92/18; H04W 72/1263; H04W 92/10
    See application file for complete search history.

(56) References Cited

U.S. PATENT DOCUMENTS

| | | | |
|---|---|---|---|
| 2005/0243748 | A1 | 11/2005 | Bosch et al. |
| 2014/0269633 | A1* | 9/2014 | Behnamfar ........... H04L 5/0073 370/336 |
| 2015/0289141 | A1* | 10/2015 | Ghasemzadeh ....... H04W 16/14 370/330 |

OTHER PUBLICATIONS

International Search Report and Written Opinion from the International Searching Authority dated Mar. 29, 2018 issued in PCT Application PCT/IB2017/058376, consisting of 14 pages.

3GPP TR 36.882 V13.0.0 (Sep. 2015) 3rd Generation Partnership Project; Technical Specification Group Radio Access Network; Evolved Universal Terrestrial Radio Access (E-UTRA); Study on Regulatory Aspects for Flexible Duplex for E-UTRAN (Release 13), consisting of 10 pages.

3GPP TR 38.802 V1 1.0 (Jan. 2017) 3rd Generation Partnership Project; Technical Specification Group Radio Access Network; Study on New Radio (NR) Access Technology Physical Layer Aspects (Release 14), consisting of 71 pages.

3GPP TS 36.213 V13.0.1 (Jan. 2016) 3rd Generation Partnership Project; Technical Specification Group Radio Access Network; Evolved Universal Terrestrial Radio Access (E-UTRA); Physical Layer Procedures (Release 13), consisting of 326 pages.

LG Electronics China Telecom "Flexible Duplex—Toward 5G Efficient Duplex Mechanisms"; 3GPP TSG RAN #71; RP-160216; Agenda Item: 10.1.1; Goteborg, Sweden, Mar. 7-10, 2016, consisting of 6 pages.

Non-Final Office Action dated Mar. 25, 2021 issued in U.S. Appl. No. 16/499,556, consisting of 14 pages.

* cited by examiner

HYBRID FREQUENCY AND TIME DUPLEXING COMMUNICATIONS

CROSS-REFERENCE TO RELATED APPLICATIONS

This application is a continuation of and claims priority to U.S. patent application Ser. No. 16/499,556, filed Sep. 30, 2019 entitled "HYBRID FREQUENCY AND TIME DUPLEXING COMMUNICATIONS," which claims priority to International Application No.: PCT/IB2017/058376, filed Dec. 22, 2017 entitled "HYBRID FREQUENCY AND TIME DUPLEXING COMMUNICATIONS," which claims priority to U.S. Provisional Patent Application Ser. No. 62/480,668 filed Apr. 3, 2017 entitled "HYBRID FREQUENCY AND TIME DUPLEXING COMMUNICATIONS," the entireties of all of which are incorporated herein by reference.

TECHNICAL FIELD

This disclosure relates to wireless communications, and in particular, to hybrid frequency and time duplexing.

BACKGROUND

Traditionally, there are two dominant duplexing arrangements in wireless communications today: Frequency Division Duplex (FDD) and Time Division Duplex (TDD). Radio spectrum regulations by national administrations usually facilitate either or both of these arrangements in different spectrum operating bands and in different parts of the world.

For TDD operation, an unpaired band is allocated and uplink (from the wireless device to the network node, such as a base station) and downlink (from the network node, such as a base station, to the wireless device) operation are configured on one basis of transmission time interval (TTI), or transmission frame in the same spectrum band. TDD arrangements evolve from static/semi-static configurable in fourth generation long term evolution (4G LTE) systems to dynamic configurable in fifth generation New Radio (5G NR) systems.

For FDD operation, paired spectrum bands with equal bandwidth are usually allocated, in which one band is for uplink (UL) and another band is for downlink (DL). It is also noted that there are a few DL only bands that have been recently allocated so as to be complementary to FDD paired spectrum bands. In general, transmission direction (downlink or uplink) is strictly defined in each band of the paired spectrum.

In the $3^{rd}$ Generation Partnership Project (3GPP) New Radio (NR) or (5G) discussions, there is a trend to decouple the transmission direction from the band of the paired or unpaired spectrum allocation.

This is part of a more general scope of flexible duplex communications. On the other hand, TDD operation also evolves to dynamic TDD in which the DL and UL switch within a TTI with the minimum granularity of a transmission symbol.

Regarding regulation, a study was carried out by the 3GPP which summarizes the regulatory aspects for flexible duplex for evolved universal terrestrial radio access network (E-UTRAN). The conclusion from this study is that in at least one country, and in some frequency bands, utilizing uplink spectrum for transmission from the network node to the wireless device, i.e., downlink communication, is possible.

With the emergence of beamforming as a key enabler for fifth generation (5G) requirements, the need for accurate channel state information (CSI) at the radio base station (RBS) is essential. For TDD systems, this is achievable by leveraging channel reciprocity, which means that the network node measures the uplink (UL) channel, computes beamforming weights based on these measurements, and then applies these same weights to its subsequent downlink (DL) transmission because the same frequency band is used for both directions. Uplink transmission refers to transmission from the wireless device to the base station and downlink transmission refers to transmission from the base station to the wireless device. However, reciprocity-based algorithms are not feasible for FDD systems because UL and DL communication happens on different frequency bands. In case of FDD, the network node depends on wireless device channel state information (CSI) feedback on the UL channel. Since full CSI feedback, if possible, consumes large amounts of UL resources, quantized or compression CSI feedback schemes, such as codebook-based CSI feedback and beamforming, are generally used, but they are sub-optimal as compared to reciprocity-based beamforming.

Another negative aspect of using FDD is that the UL and DL bands are generally of the same size (bandwidth) as set traditionally by regulatory bodies. This can sometimes lead to spectrum waste because UL traffic volume tends to be lower than DL traffic volume. A recent trend is the introduction of so called Supplemental Downlink (SDL) and supplemental Uplink (SUL) to complement the traditional FDD and TDD arrangement. For SDL, a dedicated DL band is allocated by regulators in certain regions and is used together with, usually, legacy FDD bands. For SUL, some portion of an UL band, usually at lower frequency, in a paired band is used together with an TDD band at high frequency. The benefit of SUL is to improve the uplink coverage due to the better propagation range at the lower frequency band.

Note that beamforming is just one of many aspects of the system that can benefit from channel reciprocity (in LTE, this implies downlink channel estimation using uplink reference signals such as the Sounding Reference Signal (SRS) or the Demodulation Reference Signal (DMRS)). In general, without the availability of channel reciprocity, the network node must rely on feedback from the wireless device, e.g., channel quality reports, which is a slow and costly process.

SUMMARY

A method, network node and wireless device configured to allocate resources for uplink-downlink and sidelink communications in a wireless communication system are disclosed. According to one aspect, the method includes selecting a per-band duplexing cadence for each of at least two frequency bands, a duplexing cadence defining a downlink/uplink pattern of adjacent successive time slots. The method also includes allocating each of the at least two frequency bands to one of uplink and downlink transmission in each of adjacent successive time slots according to the per-band duplexing cadence for the frequency band.

Some embodiments enable techniques such as beamforming that can benefit from channel reciprocity offered by TDD while operating in an FDD-like configuration. Some embodiments achieve flexible distribution of spectral resources between DL and UL beyond what traditional FDD and TDD offer. This enables payload scheduling across bands, including multi-band diversity transmission, multi-band multiplexing and multi-band link adaptation. This can lead to more efficient spectrum management while optimizing both UL and DL throughput.

Overall, with the availability of channel reciprocity in an FDD-like system, the network node, such as for example, a radio base station, would be self-sufficient, thus achieving more precise beamforming weights from a performance point of view and, at the same time, minimizing the CSI feedback cost from an overhead point of view. Note however, that the receiver complexity at the network node may increase, but this may be an acceptable trade-off given the advantages of the proposed approach.

According to one aspect, in some embodiments, a method in a first network node for allocating resources for reverse link transmissions from a second network node and forward link transmissions to the second network node in a wireless communication system is provided. The method includes selecting a per-band duplexing cadence for each of at least two frequency bands, a duplexing cadence defining a forward link/reverse link pattern of adjacent successive time slots. The method also includes allocating each of the at least two frequency bands to one of forward link and reverse link transmission in each of adjacent successive time slots according to the per-band duplexing cadence for the frequency band.

According to this aspect, in some embodiments, the first network node is a base station, the second network node is a wireless device, the forward link is a downlink and the reverse link is an uplink. In some embodiments, the first network node is a first wireless device, the second network node is a second wireless device, the forward link is a first sidelink from the first wireless device to the second wireless device and the reverse link is a second sidelink from the second wireless device to the first wireless device. In some embodiments, a first frequency band of the at least two frequency bands is allocated according to a forward link to reverse link ratio of 3 to 1, a second frequency band of the at least two frequency bands is allocated according to a forward link to reverse link ratio of 2 to 1, and a third frequency band of the at least two frequency bands is allocated according to a forward link to reverse link ratio of 1 to 1.

In some embodiments, each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot. In some embodiments, each of the at least two frequency bands has a different bandwidth. In some embodiments, a first payload for the second network node device is transmitted on a forward link in multiple frequencies bands of the at least two frequency bands during a same time slot. In some embodiments, a first part of a payload for the second network node is transmitted in a first frequency band of the at least two frequency bands in a first time slot and a second part of the payload for the second network node is transmitted in a second frequency band of the at least two frequency bands in the first time slot.

In some embodiments, M parts of the payload are each transmitted in a different one of M frequency bands of the at least two frequency bands during one time slot. In some embodiments, an allocation of parts of the payload among different frequency bands of the at least two frequency bands is based on channel conditions in at least one frequency band of the at least two frequency bands. In some embodiments, an allocation of parts of the payload among different frequency bands of the at least two frequency bands is based on a bandwidth of at least one frequency band of the at least two frequency bands. In some embodiments, the method further includes assigning a modulation and coding scheme, MCS, for a forward link transmission on a frequency band of the at least two frequency bands based on a bandwidth of the frequency band of the at least two frequency bands.

In some embodiments, the method further includes when a transmission of a payload to the second network node in a first frequency band of the at least two frequency bands fails, resulting in a hybrid automatic repeat request, HARQ, non-acknowledgment signal from the second network node, re-transmitting the payload in a different frequency band of the at least two frequency bands in a subsequent time slot. In some embodiments, network node-specific control information transmitted in one frequency band of the at least two frequency bands includes control information relevant to data channels of another frequency band of the at least two frequency bands.

According to another aspect, in some embodiments, first network node for allocating resources for reverse link transmissions from a second network node and forward link transmissions to the second network node in a wireless communication system is provided. The first network node includes a memory configured to store duplexing cadences. The first network node also includes a processor in communication with the memory and configured to select a per-band duplexing cadence for each of at least two frequency bands, a duplexing cadence defining a forward link/reverse link pattern of adjacent successive time slots. The processor is further configured to allocate each of the at least two frequency bands to one of forward link and reverse link transmission in each of adjacent successive time slots according to the per-band duplexing cadence for the frequency band.

According to this aspect, in some embodiments, the first network node is a base station, the second network node is a wireless device, the forward link is a downlink and the reverse link is an uplink. In some embodiments, the first network node is a first wireless device, the second network node is a second wireless device, the forward link is a first sidelink from the first wireless device to the second wireless device and the reverse link is a second sidelink from the second wireless device to the first wireless device. In some embodiments, a first frequency band of the at least two frequency bands is allocated according to a forward link to reverse link ratio of 3 to 1, a second frequency band of the at least two frequency bands is allocated according to a forward link and reverse link ratio of 2 to 1, and a third frequency band of the at least two frequency bands is allocated according to a forward link to reverse link ratio of 1 to 1.

In some embodiments, each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot. In some embodiments, each of the at least two frequency bands has a different bandwidth. In some embodiments, a first payload for the second network node is transmitted on a forward link in multiple frequencies bands of the at least two frequency bands during a same time slot. In some embodiments, a first part of a payload for the second network node is transmitted in a first frequency band of the at least two frequency bands in a first time slot and a second part of the payload for the second network node is transmitted in a second frequency band of the at least two frequency bands in the first time slot. In some embodiments, M parts of the payload are each transmitted in a different one of M frequency bands of the at least two frequency bands during one time slot. In some embodiments, an allocation of parts of the payload among different frequency bands of the at least two frequency bands is based on channel conditions in at least one frequency band of the at least two frequency bands. In some embodiments, an allocation of parts of the payload among different frequency bands of the at least two frequency bands is based on a bandwidth of at least one frequency band of the at least two frequency bands.

In some embodiments, the processor is further configured to assign a modulation and coding scheme, MCS, for a forward link transmission on a frequency band of the at least two frequency bands based on a bandwidth of the frequency band of the at least two frequency bands. In some embodiments, the processor is further configured to, when a transmission of a payload to the second network node in a first frequency band of the at least two frequency bands fails, resulting in a hybrid automatic repeat request, HARQ, non-acknowledgment signal from the second network node, re-transmit the payload in a different frequency band of the at least two frequency bands in a subsequent time slot. In some embodiments, network node-specific control information transmitted in one frequency band of the at least two frequency bands includes control information relevant to data channels of another frequency band of the at least two frequency bands.

According to yet another aspect, in some embodiments, a first network node for allocating resources for reverse link transmissions from a second network node and forward link transmissions to the second network node in a wireless communication system is provided. The first network node includes a memory module configured to store duplexing cadences. The first network node also includes a duplexing selector module configured to select a per-band duplexing cadence for each of at least two frequency bands, a duplexing cadence defining a forward link/reverse link pattern of adjacent successive time slots. The first network node also includes a frequency band allocator module configured to allocate each of the at least two frequency bands to one of forward link and reverse link transmission in each of adjacent successive time slots according to the per-band duplexing cadence for the frequency band.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
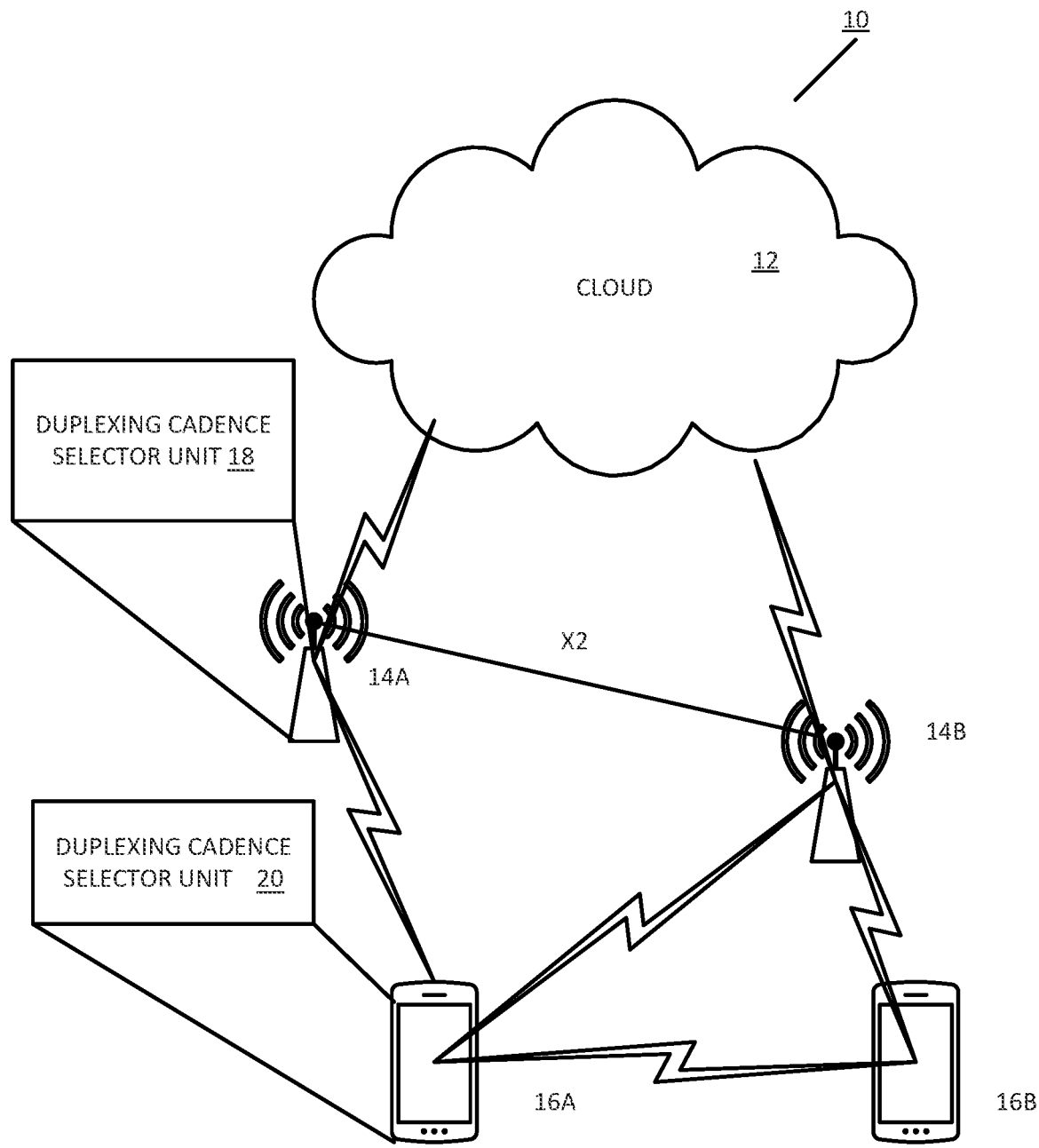
FIG. 1 is a block diagram of a wireless communication system constructed according to principles set forth herein.

Before describing in detail exemplary embodiments, it is noted that the embodiments reside primarily in combinations of apparatus components and processing steps related to hybrid frequency and time duplexing. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide a flexible frequency/time duplexing arrangement that is a hybrid of FDD and TDD. Specifically, for two FDD-like frequency bands (or a pair of spectrum bands for legacy FDD), instead of dedicating one for the UL and the other for the DL, there is systematic switching between the UL and the DL across time slots in each of these frequency bands according to a predefined duplexing cadence, i.e., pattern for each frequency band.

In general, the switching schedule may be specified by allowing a given band to be allocated for DL communication for multiple time slots before switching to UL communication for another set of multiple time slots. The number of time slots allocated for the DL and the UL may or may not be the same.

Some embodiments extend the applicability of the proposed technique by considering more than two frequency bands. This allows a disproportional amount of DL and UL resources to be allocated across the bands in any given time slot. As used herein, the term "slot" may refer to (but is not limited to) a time slot, such as a legacy time unit with a fixed number of symbols, a subframe in LTE, for example, a basic scheduling unit with a variable number of symbols, a slot or a mini-slot in NR. Also, as used herein, a "pattern" may refer to (but is not limited to) a pattern or ordering of forward link and reverse link transmissions such that a pattern has a ratio of forward link to reverse link transmissions.

Some embodiments utilize the advantages facilitated by the flexible duplexing arrangement and propose techniques to schedule payloads across multiple bands and time slots in a manner that would benefit the system's performance. Specifically, some embodiments include arrangements for intelligently correlating the data and control payloads in different bands available in a given time slot. Some embodiments also propose intelligent link adaptation and predictive retransmission methods that make use of flexible duplexing.

The above mentioned spectrum management, in general, is an enhancement of the legacy radio resource management (RRM) framework so as to handle multiple bands, especially for the paired spectrum bands of FDD. In LTE/4G, RRM is based on static or semi-static DL and UL configuration with the granularity of Transmission Time Internal (TTI) for single component carrier or for multiple component carriers in a carrier aggregation scenario. In NR/5G proposals in 3GPP, a dynamic TDD configuration has been generally accepted, in which the DL and the UL are configurable with the granularity of a transmission symbol within the same TTI.

Referring now to the drawing figures, in which like elements are referred to by like reference numerals, there is shown in FIG. 1 a block diagram of a wireless communication system 10 constructed according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more base stations 14A and 14B, which may communicate directly via an X2 interface in LTE embodiments, and are referred to collectively as base stations 14. It is contemplated that that other interface types can be used for communication between base stations 14 for other communication protocols such as New Radio (NR). The base stations 14 may serve wireless devices 16A and 16B, referred to collectively herein as wireless devices 16. Note that, although only two wireless devices 16 and two base stations 14 are shown for convenience, the wireless communication network 10 may typically include many more wireless devices (WDs) 16 and base stations 14. Further, in some embodiments, WDs may communicate directly using what is sometimes referred to as a side link connection.

To facilitate discussion, the term network node may refer to a base station and may also refer to a wireless device. Thus, communication may be between a base station (a first network node) and a wireless device (a second network node) in some embodiments. In some embodiments, communication may be between a first wireless device (a first network node) and a second wireless device (a second network node). Also, as used herein, a forward link (FL) refers to transmission from a first network node to a second network node and a reverse link (RL) refers to transmission in the opposite direction from the second network node to the first network node. When communication is between a base station and a wireless device, the forward link is a downlink from the base station to the wireless device, and the reverse link is an uplink from the wireless device to the base station. When communication is between a first wireless device and a second wireless device, the forward and reverse links may be referred to as sidelinks.

Thus, in some embodiments, a method in a first wireless device 16a for allocating resources for side link transmissions from a second wireless device 16b and side link transmissions to the second wireless device 16b in a wireless communication system is provided. The method includes selecting a per-band duplexing cadence for each of at least two frequency bands, a duplexing cadence defining a side link (forward link/reverse link) pattern of adjacent successive time slots. The method further includes allocating each of the at least two frequency bands to one of side link transmission to the second wireless device 16b and side link transmission from the second wireless device 16b in each of adjacent successive time slots according to the per-band duplexing cadence for the frequency band.

The term "wireless device" or mobile terminal used herein may refer to any type of wireless device communicating with a base station 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "base station" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by base station 14, it is understood that the functions can be performed in other network nodes and elements. It is also understood that the functions of the base station 14 can be distributed across network cloud 12 so that other nodes can perform one or more functions or even parts of functions described herein.

Figure 2:
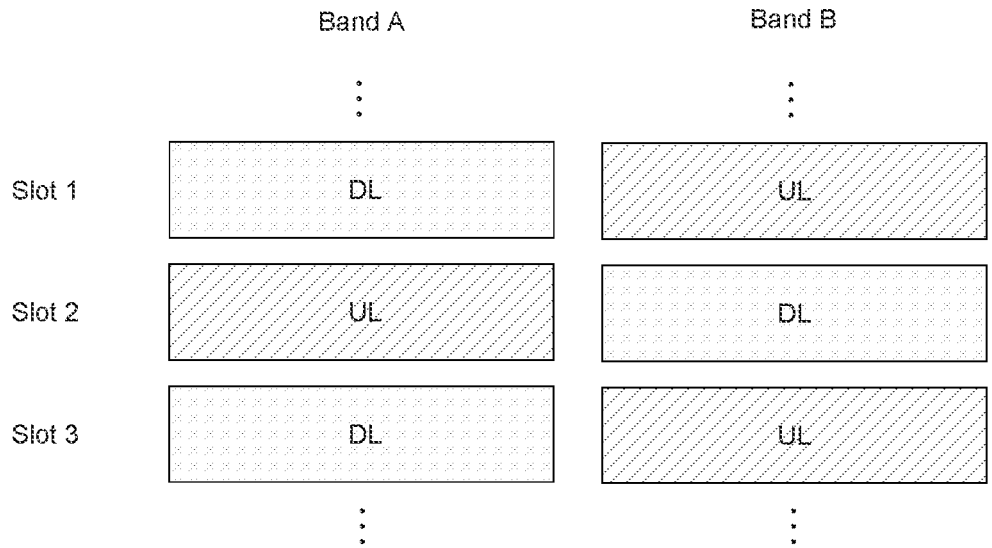
FIG. 2 illustrates one embodiment where the downlink and uplink alternate from one time slot to the next.

As shown in FIG. 1, the base station 14 has a duplexing cadence selector unit 18 configured to select a per-band duplexing cadence, i.e., pattern, for each of at least two frequency bands and a duplexing cadence defining a downlink/uplink pattern of adjacent successive time slots, as will be explained more fully below with reference to FIGS. 2-4. Also, wireless device 16 has a duplexing cadence selector unit 20. In some embodiments, the duplexing cadence selector unit 20 of the wireless device 16 selects a duplexing cadence in accordance with a command received from the base station 14.

Thus, a wireless communication network 10 is considered herein, where a base station 14 is used to serve wireless devices 16 in its respective coverage area. Without loss of generality, embodiments may encompass:

a single-cell scenario, where a single base station 14 communicates with an arbitrary number of wireless devices 16; and an LTE, LTE-Advanced, or 5G system where time is broken down into radio frames, each of which is decomposed into a pre-determined number of subframes, and each subframe is further decomposed into a pre-determined number of orthogonal frequency division multiplex (OFDM) symbols. A different set of wireless devices 16 may be served in each subframe.

The term "time slot" may be used in reference to a 3GPP-based LTE subframe, 5G/NR slot, a set of symbols (applicable to the Dynamic TDD concept where FL/RL switching happens within a subframe), or any other well-defined time slice in which RL/FL switching is possible. Unless otherwise specified, "time slot" alludes to the concept of duplexing. In some embodiments, scheduling may be performed where time may potentially be sliced with a different granularity. These may be referred to by the term "scheduling time slot."

One assumption made herein is that both the base station 14 and the wireless devices 16 have knowledge of the duplexing cadence and are synchronized (with proper timing advance measurement and adjustment) in this regard.

Embodiment 1: Hybrid Time and Frequency Division Duplexing

In this embodiment, the duplexing scheme is a hybrid of traditional FDD and TDD schemes, wherein FL and RL resource allocations are cyclically alternated across frequency and time partitions. For example, with reference to FIG. 2, consider a snapshot of three adjacent times slots (denoted as Slots 1, 2, and 3). Also consider two different, and not necessarily adjacent, frequency bands (denoted as Bands A and B) in each slot. In Slot 1, Band A is used for DL or FL communication and Band B is used for UL or RL communication. Then in Slot 2, these allocations are reversed, and finally in Slot 3 they are the same as in Slot 1.

This technique of FL and RL switching from one slot to the next facilitates reciprocity-based algorithms that would previously have only been possible with pure TDD systems and not with FDD systems. Specifically, the base station 14 can measure the RL channel for a band in a given time slot in which this band is allocated for UL, perform channel sounding procedures and channel estimation which can be used for FL link adaptation and beamforming in subsequent slots when that band is allocated for FL. This technique applies as long as the time spanned by adjacent RL and FL time slots is sufficiently small such that the computed channel estimation does not become deprecated. This is usually the case with LTE, and will particularly be useful in 5G and NR with short TTIs.

For example, in the scenario illustrated in FIG. 2, the base station 14 can operate as follows:
Slot 1
  Band B: Take channel measurements; perform channel sounding procedures and channel estimation.
Slot 2
  Band A: Take channel measurements; perform channel sounding procedures and channel estimation.
  Band B: Utilize the measurements from Slot 1 for this band to perform DL link adaptation and beamforming.
Slot 3:
  Band A: Utilize the measurements from Slot 2 for this band to perform DL link adaptation and beamforming.
  Band B: Take channel measurements; perform channel sounding procedures and channel estimation for use in the next slot.
This process can be repeated indefinitely with similar behavior in odd- and even-numbered slots In some embodiments, the hybrid duplexing scheme described above may be expanded to allow a given frequency band to be allocated to the FL or the RL for multiple time slots instead of just one. Such a generalization is driven by the fact that the FL traffic load is usually heavier than the RL traffic load, and equal resource allocations to both the RL and the FL may be sub-optimal. By enabling such a generalized allocation, it is possible to give a greater amount of resources to the FL as compared to the RL (or vice versa in the rare case that it is needed).

Figure 3:
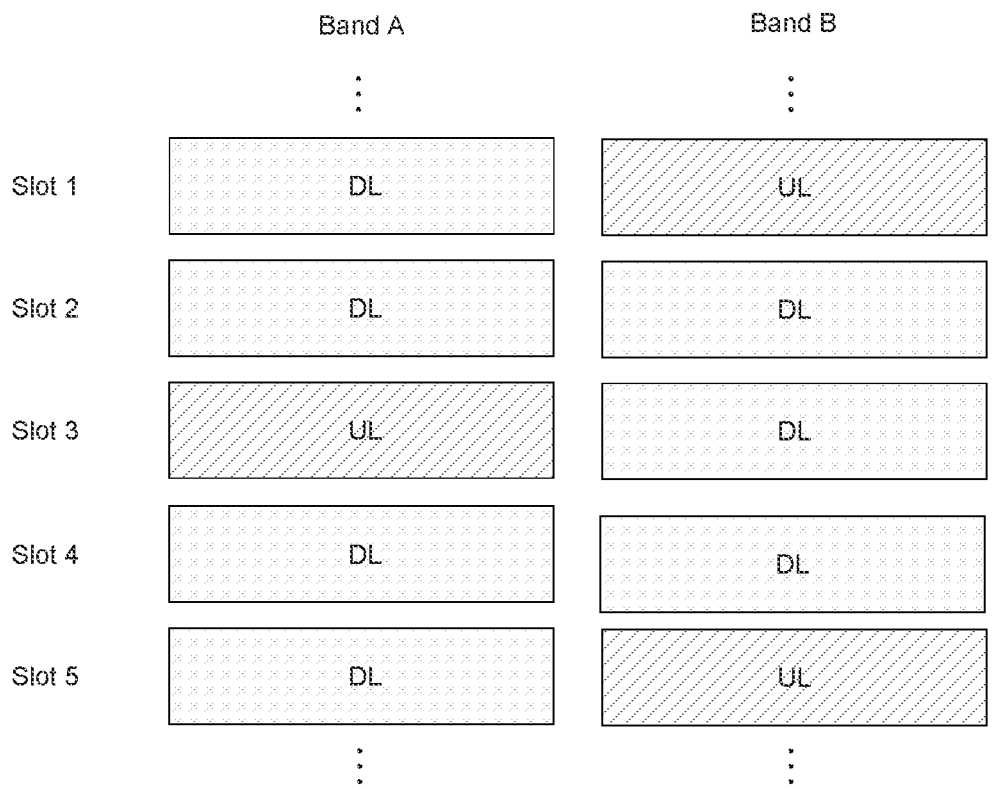
FIG. 3 illustrates another embodiment with a different duplexing cadence for two frequency bands.
Figure 4:
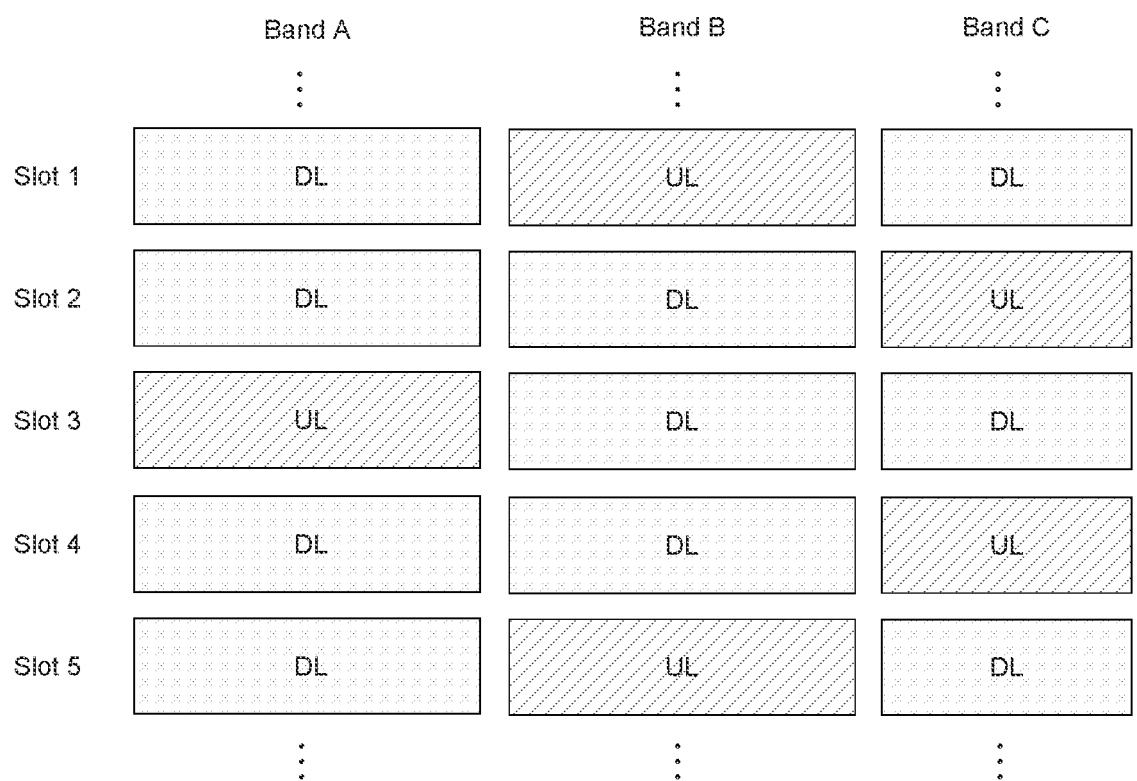
FIG. 4 illustrates another embodiment with different duplexing cadences for three different frequency bands.

For example, consider the resource scheduling pattern shown in FIG. 3. FIG. 3 shows two bands spanning five time slots. In Band A, the FL/RL resource ratio is 2:1. Similarly, in Band B, the FL/RL ratio is 3:1. Collectively, this set of ratios is represented in both bands and their particular configuration with respect to each other as the system's "duplexing cadence", i.e., duplexing pattern. This duplexing cadence can be parametrized as part of regulatory and standardization activities. The base station 14 could then pick a particular cadence and inform all attached wireless device 16 of the selected cadence. It is unlikely that this cadence would change during the lifetime of a cell/sector or the deployed network in general, unless some elaborate coordination arrangement could be established with adjacent base stations. As used herein, the per-band cadence is the ratio of downlink to uplink transmissions for adjacent successive time slots for a particular frequency band.

In some embodiments, the hybrid duplexing scheme is generalized to span across N frequency bands, where N>2. Consider, without loss of generality, a scenario where three frequency bands are now available for simultaneous resource scheduling. One example of this is shown in FIG. 4, where the width of the band corresponds to the bandwidth of the band. These bands need not be of the same bandwidth (note the difference in the size of Band C as compared to Bands A and B in FIG. 4). In such a scenario, the concept of duplexing cadence can be appropriately expanded to cover all the bands. This approach gives operators greater freedom to utilize their available bands as they need and not be forced to limit themselves to just two bands as in FDD. In FIG. 4, the per-band duplexing cadence for band A is 2:1, the per-band duplexing cadence for band B is 3:1 and the per-band duplexing cadence for band C is 1:1.

Figure 5:
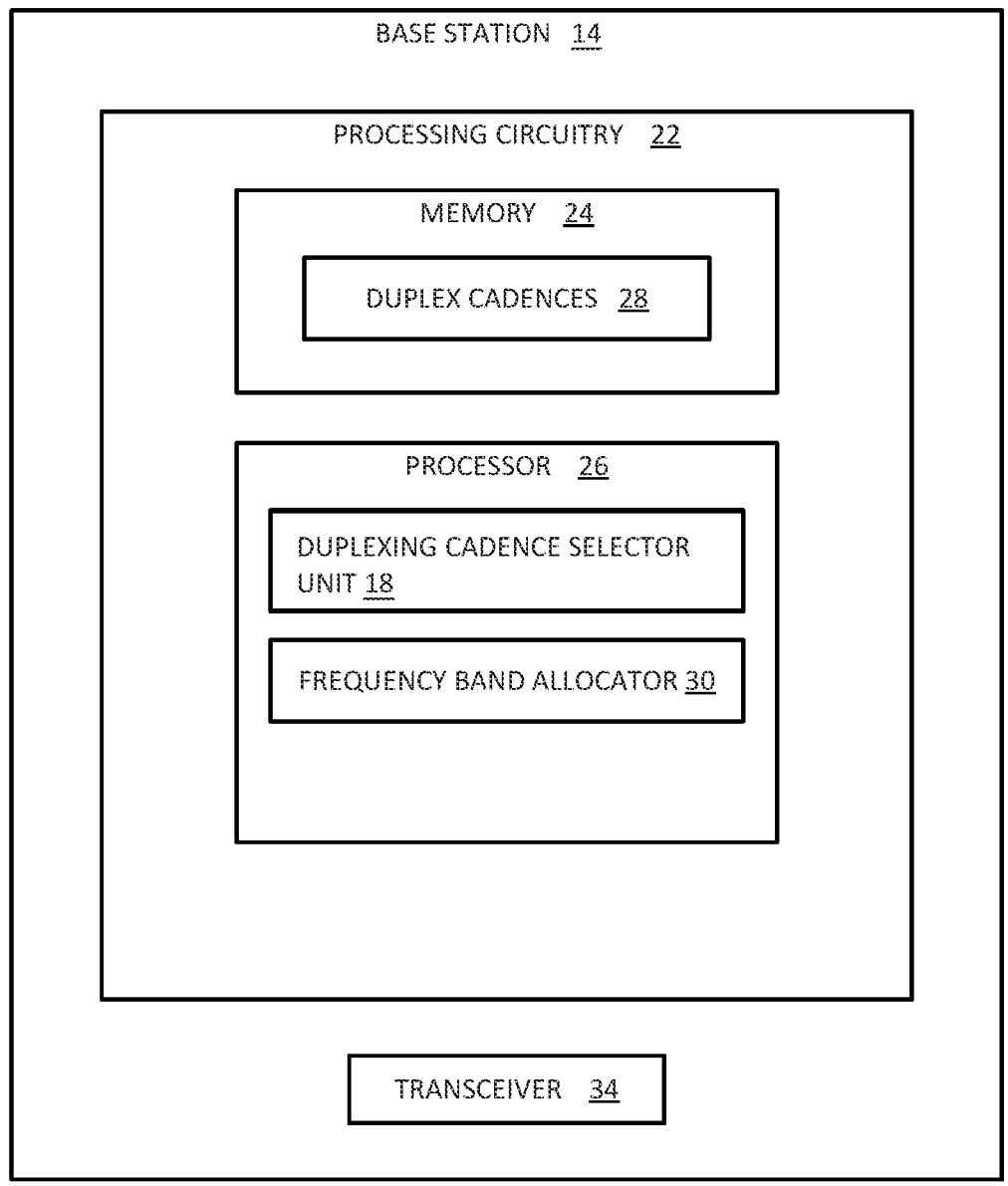
FIG. 5 is a block diagram of a network node configured according to principles set forth herein.

FIG. 5 is a block diagram of a base station 14 configured according to principles set forth herein. The base station 14 includes processing circuitry 22. In some embodiments, the processing circuitry 22 may include a memory 24 and processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store duplexing cadences 28 determined by the duplexing cadence selector unit 18 of the base station 14. The duplexing cadence selector unit 18 may be implemented by the processor 26 to select a per-band duplexing cadence for each of at least two frequency bands, a duplexing cadence defining a downlink-to-uplink ratio or pattern of adjacent successive time slots. The base station 14 also includes a frequency band allocator 30, which may be implemented by the processor 26 to allocate each of the at least two frequency bands to one of uplink and downlink transmission in each of adjacent successive time slots according to the per-band duplexing cadence for the frequency band. A transceiver 34 of the base station 14 is configured to transmit on the downlink and receive on the uplink at each frequency configured by the base station 14.

Figure 6:
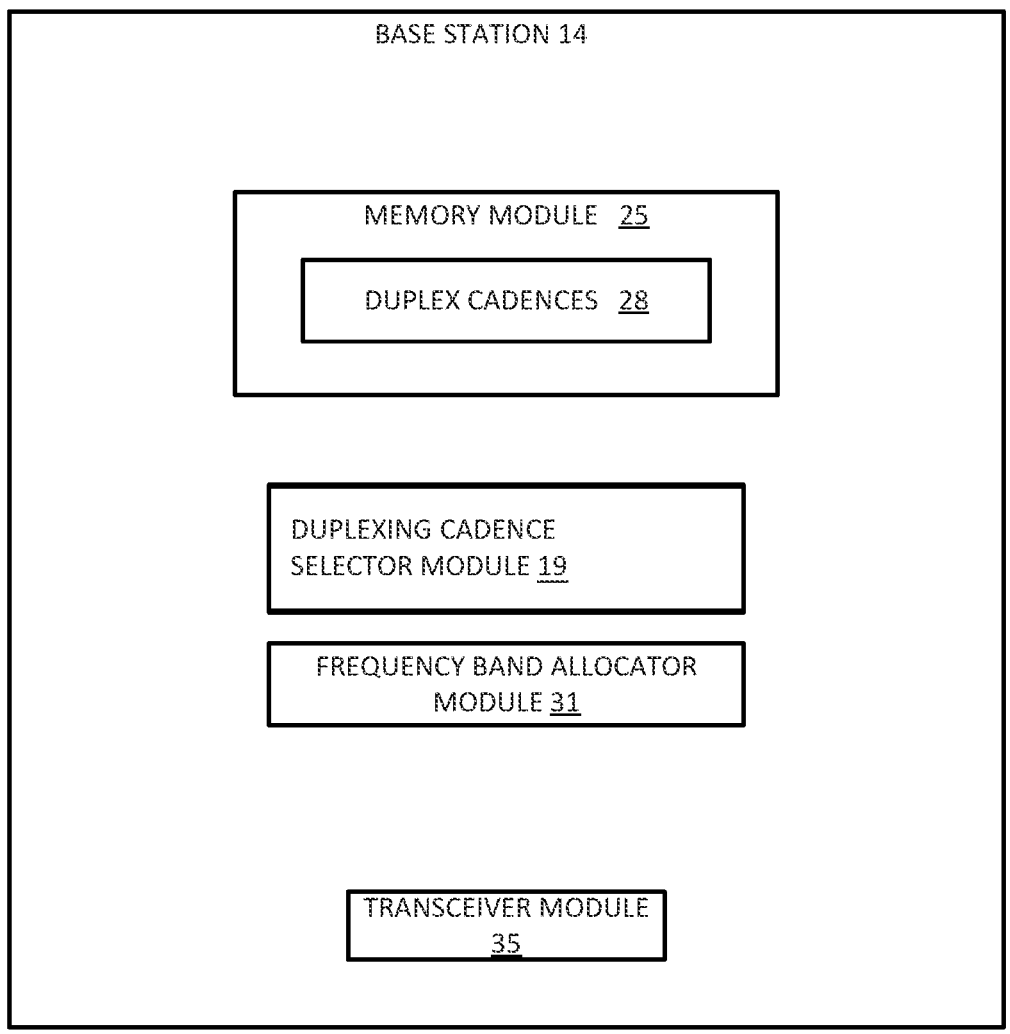
FIG. 6 is a block diagram of an alternative embodiment of the network node.

FIG. 6 is a block diagram of an alternative embodiment of the base station 14, which includes a memory module 25 configured to store duplexing cadences 28 generated by a duplexing selector module 19. The duplexing selector module 19 is configured to select a per-band duplexing cadence for each of at least two frequency bands, a duplexing cadence defining a downlink-to-uplink ratio or pattern of adjacent successive time slots. A frequency band allocator module 31 is configured to allocate each of the at least two frequency bands to one of uplink and downlink transmission in each of adjacent successive time slots according to the per-band duplexing cadence for the frequency band. The transceiver module 35 is configured to transmit on the downlink and receive on the uplink at each frequency configured by the base station 14.

Figure 7:
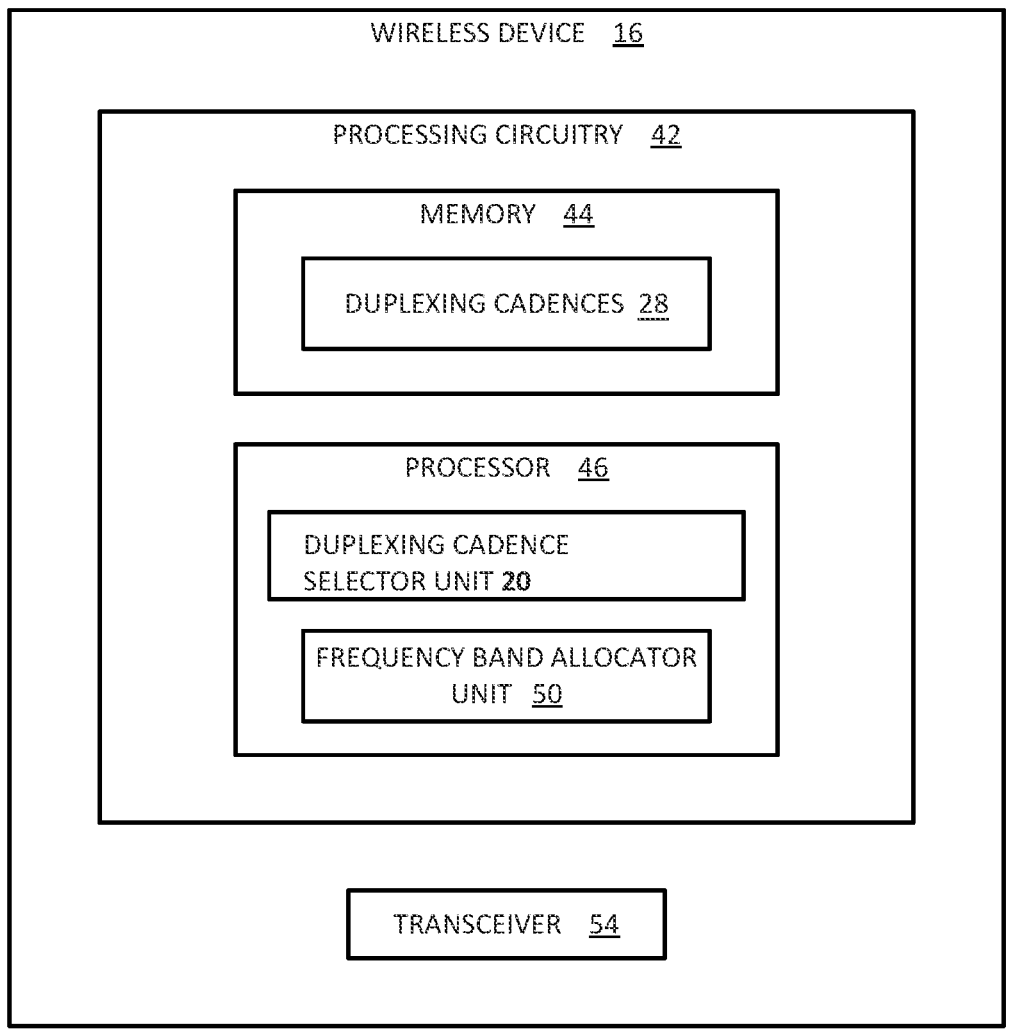
FIG. 7 is a block diagram of a wireless device configured according to principles set forth herein.

FIG. 7 is a block diagram of a wireless device 16, which includes processing circuitry 42. In some embodiments, the processing circuitry 42 may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store duplexing cadences 28. These may be the same as the duplexing cadences of the base station 14, except that when the base station 14 transmits on a downlink, the wireless device 16 receives on the downlink, and vice versa for the uplink. Consequently, the duplexing selector unit 20 implemented by the processor 46 selects a duplexing cadence that is consistent with the duplexing cadence used by the base station 14. A frequency band allocator unit 50 is configured to allocate each of the at least two frequency bands to one of uplink and downlink transmission in each of adjacent successive time slots according to the per-band duplexing cadence for the frequency band. A transceiver 54 of the wireless device 16 is configured to transmit on the uplink and receive on the downlink.

Figure 8:
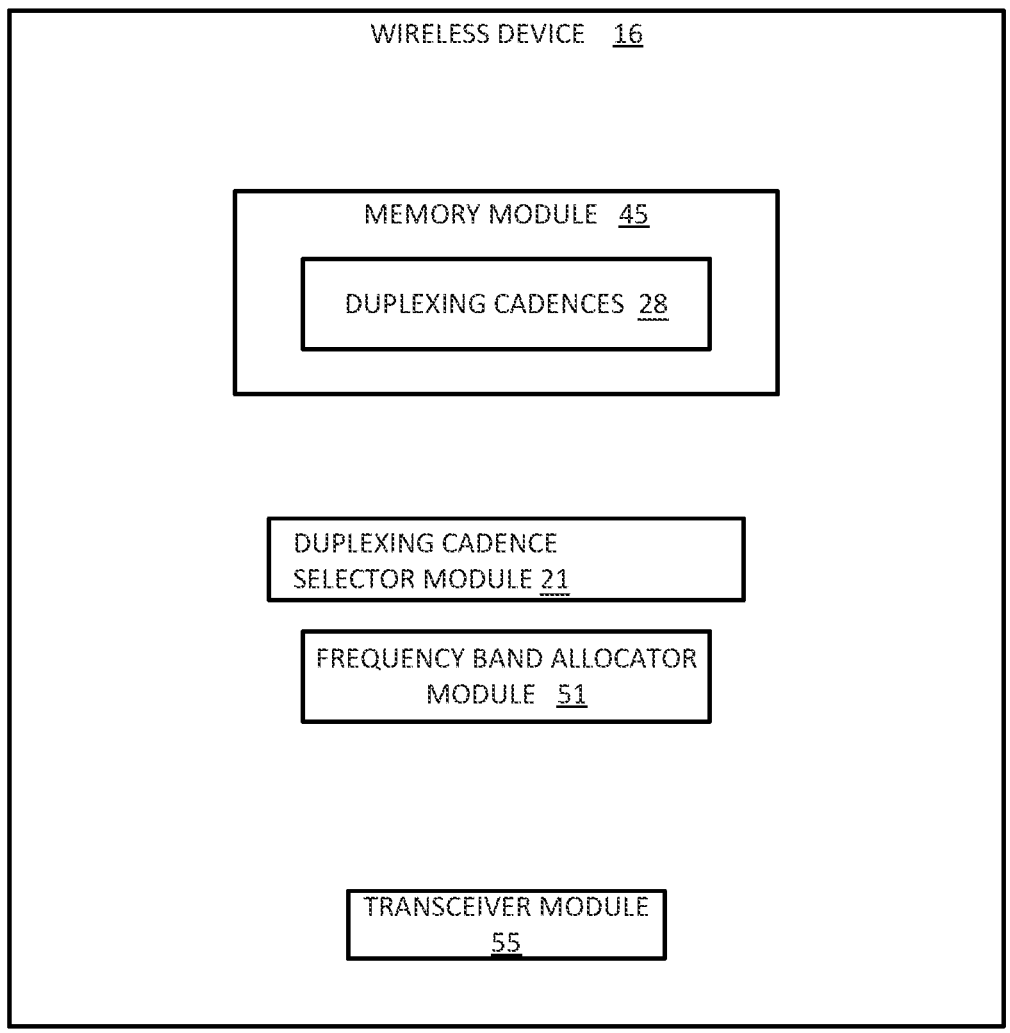
FIG. 8 is block diagram of an alternative embodiment of the wireless device.

FIG. 8 is block diagram of an alternative embodiment of the wireless device 16 having a memory module 45 configured to store the duplexing cadences 28. A duplexing selector module 21 configured to select a per-band duplexing cadence for each of at least two frequency bands, a duplexing cadence defining a forward link to reverse link ratio of adjacent successive time slots. A frequency band allocator module 51 configured to allocate each of the at least two frequency bands to one of forward link and reverse link transmission in each of adjacent successive time slots according to the per-band duplexing cadence for the frequency band. A transceiver module 55 of the wireless device 16 is configured to transmit on the uplink and receive on the downlink.

Figure 9:
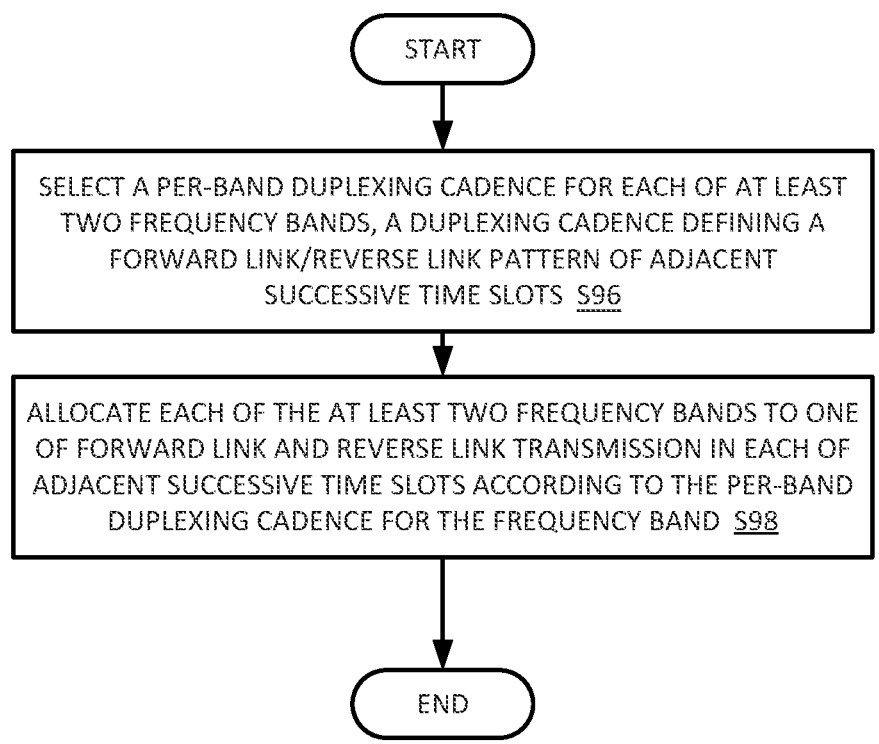
FIG. 9 is a flowchart of an exemplary process that can be implemented in either the network node or the wireless device.

FIG. 9 is a flowchart of an exemplary process that can be implemented in either the base station 14 or the wireless device 16. When implemented by the wireless device 16, the duplexing cadence that is selected may be in accordance with a command received by the wireless device 16 from the base station 14. The process includes selecting, via the duplexing selector unit 18 or 20, a per-band duplexing cadence for each of at least two frequency bands, a duplexing cadence defining a forward link to reverse link ratio of adjacent successive time slots (block S96). The process also includes allocating, via a frequency band allocator unit 30 or 50, each of the at least two frequency bands to one of forward link and reverse link transmission in each of adjacent successive time slots according to the per-band duplexing cadence for the frequency band (block S98).

Figure 10:
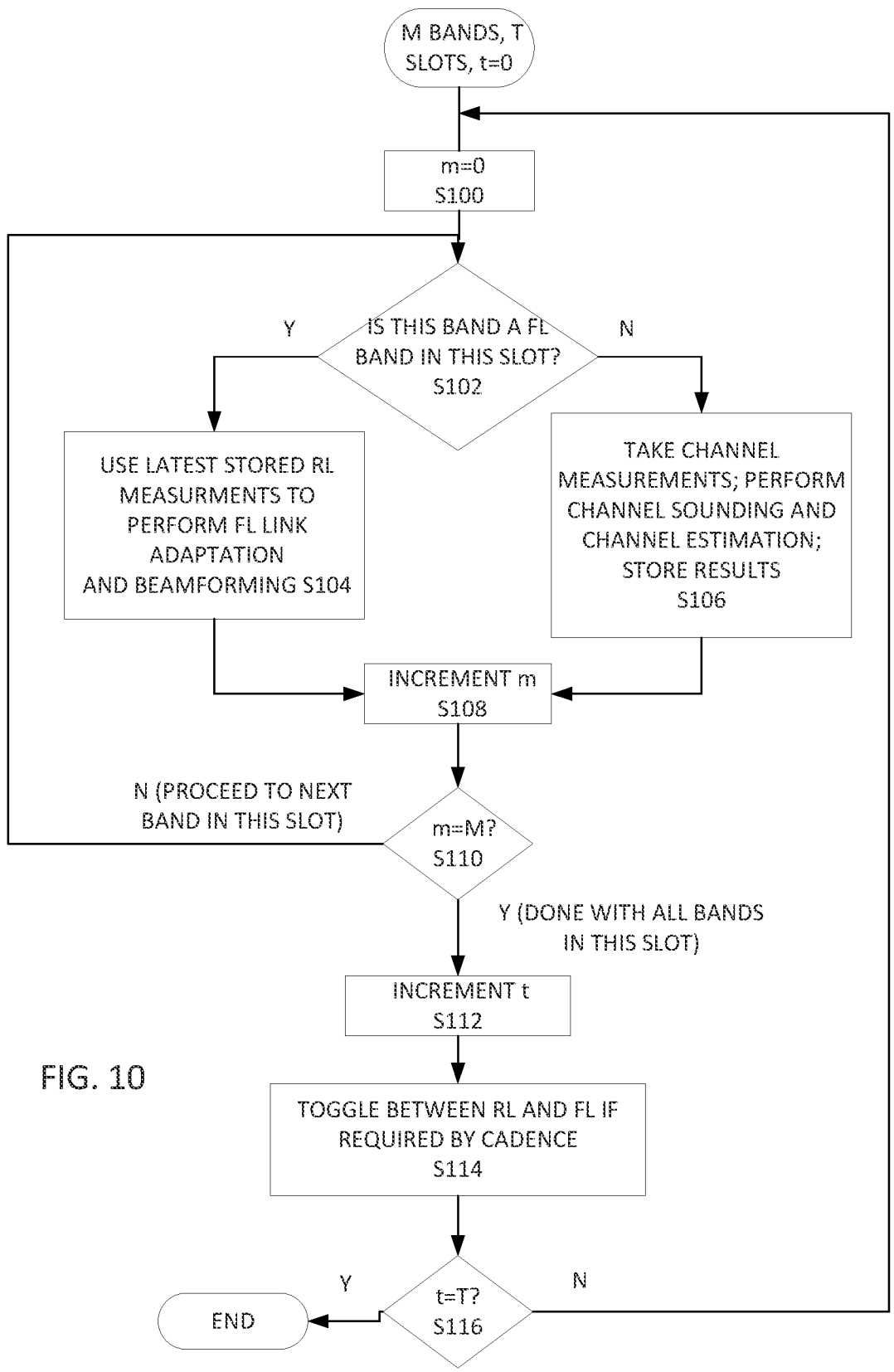
FIG. 10 is a flowchart of an exemplary process for duplexing cadence implementation among N frequency bands.

FIG. 10 is a flowchart of an exemplary process for duplexing cadence implementation among M frequency bands. The process of FIG. 10 starts at time t equal to zero and the iterations will be for M frequency bands and T time slots. The process also starts at m equal to zero (block S100). If the band is a forward link band in this time slot (block S102), the latest stored reverse link channel measurements are used to perform link adaptation and beamforming via the processor 26 (block S104). Otherwise, channel measurements are taken, channel sounding and estimation are performed by the processor 26 and the results stored in the memory 24 (block S106). Subsequently, m is incremented (block S108). If n is not equal to M (block S110), then the process proceeds to the next band to be processed in the current time slot. If this is the last band in the current time slot, the t is incremented (block S112). Just before processing bands in the next time slot, the process includes toggling between reverse link and forward link if called for by the current duplexing cadence being implemented by this band (block S114). If this is not the last time slot (block S116), the process continues for the first band of the new time slot. Otherwise the process ends.

Embodiment 2: Payload Scheduling Across Bands

In the multi-band configuration considered for the hybrid duplexing scheme, the base station 14 may strategically arrange RL (i.e., uplink or sidelink) and FL (i.e., downlink or sidelink) transmission across these bands and across multiple time slots in order to optimize network performance objectives, e.g., coverage, throughput, etc. In this embodiment, techniques are provided for correlating the payloads of these bands.

Diversity

The concept of transmission diversity is well-understood in the telecom community. It involves sending multiple copies, or variants, of the same payload over different channels that span frequency, time, or space. In LTE, spatial diversity is adopted and captured in various Transmission Modes (TMs), e.g., TM 2 and TM 3. Here, diversity is used for a hybrid duplexing system. Specifically, identical or variant copies of a particular wireless device's payload can be transmitted over two or more of the available FL bands in a given scheduling time slot. The wireless device 16 can then choose to use these identical or variant copies is a suitable manner, e.g., pick the best copy or coherently combine a subset or all of the copies. This can be advantageous from the wireless device's perspective because, if a particular band is experiencing bad channel conditions while another one is in good condition, the wireless device 16 will still be able to decode the payload.

The solution described here can be viewed as a proactive retransmission with the distinction that it is not done in time but across frequency bands instead. This might help reduce the overhead of traditional retransmission techniques (e.g., HARQ in LTE and 3GPP-based standards) even further.

Multiplexing

Multiplexing involves sending different parts of a wireless device's payload over each of the available transmission channels. In the case of LTE, spatial multiplexing is generally used for wireless devices 16 experiencing favorable channel conditions, and is captured in multiple TMs including TM 4. This concept may be herein applied to M available DL (FL) bands, whereby the overall payload to be transmitted is broken down into M blocks and each block is transmitted over a different band. This arrangement can optimize the system's throughput.

To generalize this idea, the number of blocks that the payload is broken down into may be less than M. In this case, certain blocks can be sent over multiple bands, hence mixing diversity and multiplexing.

Multi-Band Link Adaptation

With the availability of multiple FL bands in a particular time slot, it is highly likely that each band will experience a different set of channel conditions. A subset of bands may experience highly favorable channel conditions for transmission to a particular wireless device 16, while others may experience deep fades and be unable to carry a large payload in a reliable manner. For other wireless devices 16 in the same time slot, the channel conditions for each of the bands may be different. Without loss of generality, this discussion is limited to a single wireless device 16, it being understood that implementations apply to multiple wireless devices 16.

Given that the base station 14 has performed channel estimation on the band in previous time slots where they were assigned for RL, in addition to picking a suitable coding and modulation order, the base station 14 can choose to distribute the wireless device's payload such that bands that are experiencing favorable conditions are allocated a large portion of the payload. Another aspect that the base station 14 scheduler should consider when distributing the payload among the bands is their bandwidth. For example, if Band A has a larger bandwidth than Band B, but is experiencing significantly worse channel conditions than Band B, the base station 14 may choose to allocate a larger portion of the payload to Band B. Note that this arrangement can be considered a generalization of Frequency Selective Scheduling (FSS), except that now the solution space is no longer limited to a single frequency band but is generalized to multiple bands.

Focusing more specifically on the LTE-based physical downlink shared channel (PDSCH), the 3GPP specification 36.213 defines look-up tables for associating a Modulation and Coding Scheme (MCS) index with a modulation order and a Transport Block Size (TBS) index, which ultimately is used to pick the size of a Transport Block (TB) for the wireless device 16 depending on the bandwidth. This MCS is determined by the base station 14 based on feedback reports provided by the wireless device 16. Using Embodiment 1 described above, however, the base station 14 can determine the MCS for the wireless device 16 with minimum feedback of the wireless device 16. Two variants are proposed for the MCS and its determination.

There is an MCS index for each of the available FL bands. MCS indices are determined collectively with the knowledge of the channel conditions and bandwidth of each band. Once the MCS index has been determined, a table could be used to determine the TB size, and ultimately the wireless device's payload distribution across the bands.

There is a single MCS index that applies to all the FL bands. It is also determined using collective knowledge of the channel conditions and bandwidth of the bands, but there is now a longer, more elaborate look-up table through which the TB size of each band is determined based on the bandwidth of the given band.

Predictive Retransmission

One approach for the base station 14 is to leverage the differences in channel conditions experienced by a wireless device 16 in each of the available FL bands to make its retransmissions more reliable. Retransmission is an integral part of reliable communication systems, and is realized in LTE and related technologies as Hybrid Automatic Repeat Request (HARQ), whereby different versions or all of a previously transmitted payload is retransmitted to the wireless device 16 in FL allocations, if deemed necessary based on wireless device feedback. The proposal is to send retransmissions on those FL bands that are known to be in a favorable channel state so that the retransmission overhead can be minimized.

Multi-Band Control Channel Scheduling

The differences in the channel states of the different bands can also be used to improve the reliability of control channels. Control channels are generally deemed more important than data channels because they convey meta data that is critical to the system's operation, including the wireless device's ability to locate and decode its data channel. There are generally two types of control information: common control information that is relevant to multiple wireless devices 16, and wireless device-specific control information.

Noting that the favorability of a particular band is specific to the wireless device 16, i.e., the same band might not be as favorable for a different wireless device 16, the proposal is as follows:

Common control information: Distribute the control information across multiple bands, either in an identical manner or with some variant applied. This approach leverages the diversity offered through the varying favorability of different bands to each wireless device 16.

Wireless device-specific control information: Prioritize the scheduling of wireless device-specific control information over data payloads in the bands that have been identified as being in favorable channel state for a particular wireless device 16. The control information sent in these selected bands could carry meta data relevant to the data channels of other bands in which this wireless device's data is being transmitted (cross-band scheduling).

Of note, although some embodiments herein as described with reference to communications between a wireless device and a base station, all embodiments are equally applicable to device-to-device (D2D) communication (also referred to as "side link" communications in 3GPP LTE). In such embodiments, a D2D communication link may or may not be managed by the base station. In other words, more generally, the communications referred to herein may be communications between one node and another node. In this scenario, for example, the base station could be another wireless device.

Thus, some embodiments include a first wireless device for allocating resources for side link transmissions to a second wireless device and side link transmissions from the second wireless device in a wireless communication system. The first wireless device includes the memory 44 configured to store duplexing cadences 28. The first wireless device also includes a processor 46 in communication with the memory 44. The processor 46 is configured to select, via the duplexing cadence selector unit 20, a per-band duplexing cadence for each of at least two frequency bands, a duplexing cadence defining a side link (forward link to reverse link) ratio of adjacent successive time slots. The processor is further configured to allocate, via the frequency band allocator unit 50, each of the at least two frequency bands to one of side link (forward link) transmission to the second wireless device and side link (reverse link) transmission from the second wireless device in each of adjacent successive time slots according to the per-band duplexing cadence for the frequency band.

Figure 11:
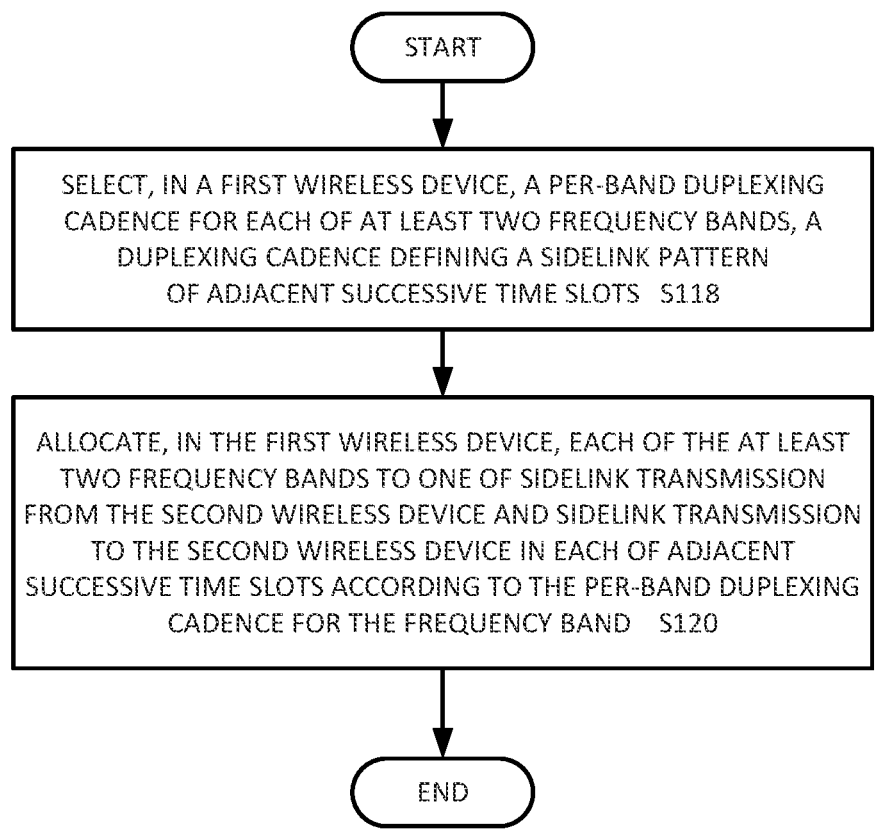
FIG. 11 is a flowchart of an exemplary process for allocating resources for side link transmissions.

FIG. 11 is a flowchart of an exemplary process for allocating resources for side link transmissions from a second wireless device and side link transmissions to the second wireless device in a wireless communication system. The process includes selecting, via the duplexing cadence selector unit 20, a per-band duplexing cadence for each of at least two frequency bands, a duplexing cadence defining a side link ratio or pattern of adjacent successive time slots (block S118). The process also includes allocating, via the frequency band allocator unit 50, each of the at least two frequency bands to one of side link transmission to the second wireless device and side link transmission from the second wireless device in each of adjacent successive time slots according to the per-band duplexing cadence for the frequency band (block S120).

In some embodiments, a method in a first network node (14, 16) for allocating resources for reverse link transmissions from a second network node (16) and forward link transmissions to the second network node (16) in a wireless communication system is provided. The method includes selecting a per-band duplexing cadence for each of at least two frequency bands, a duplexing cadence defining a forward link/reverse link pattern of adjacent successive time slots (S118). The method also includes allocating each of the at least two frequency bands to one of forward link and reverse link transmission in each of adjacent successive time slots according to the per-band duplexing cadence for the frequency band (S120).

According to this aspect, in some embodiments, the first network node is a base station 14, the second network node is a wireless device 16, the forward link is a downlink and the reverse link is an uplink. In some embodiments, the first network node is a first wireless device 16, the second network node is a second wireless device 16, the forward link is a first sidelink from the first wireless device 16 to the second wireless device 16 and the reverse link is a second sidelink from the second wireless device 16 to the first wireless device 16. In some embodiments, a first frequency band of the at least two frequency bands is allocated according to a forward link to reverse link ratio of 3 to 1, a second frequency band of the at least two frequency bands is allocated according to a forward link to reverse link ratio of 2 to 1, and a third frequency band of the at least two frequency bands is allocated according to a forward link to reverse link ratio of 1 to 1.

In some embodiments, each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot. In some embodiments, each of the at least two frequency bands has a different bandwidth. In some embodiments, a first payload for the second network node 16 is transmitted on a forward link in multiple frequencies bands of the at least two frequency bands during a same time slot. In some embodiments, a first part of a payload for the second network node 16 is transmitted in a first frequency band of the at least two frequency bands in a first time slot and a second part of the payload for the second network node (16) is transmitted in a second frequency band of the at least two frequency bands in the first time slot. In some embodiments, M parts of the payload are each transmitted in a different one of M frequency bands of the at least two frequency bands during one time slot.

In some embodiments, an allocation of parts of the payload among different frequency bands of the at least two frequency bands is based on channel conditions in at least one frequency band of the at least two frequency bands. In some embodiments, an allocation of parts of the payload among different frequency bands of the at least two frequency bands is based on a bandwidth of at least one frequency band of the at least two frequency bands. In some embodiments, the method further includes assigning a modulation and coding scheme, MCS, for a forward link transmission on a frequency band of the at least two frequency bands based on a bandwidth of the frequency band of the at least two frequency bands. In some embodiments, the method further includes when a transmission of a payload to the second network node 16 in a first frequency band of the at least two frequency bands fails, resulting in a hybrid automatic repeat request, HARQ, non-acknowledgment signal from the second network node 16, re-transmitting the payload in a different frequency band of the at least two frequency bands in a subsequent time slot. In some embodiments, network node-specific control information transmitted in one frequency band of the at least two frequency bands includes control information relevant to data channels of another frequency band of the at least two frequency bands.

According to another aspect, in some embodiments, a first network node 14, 16 for allocating resources for reverse link transmissions from a second network node 16 and forward link transmissions to the second network node 16 in a wireless communication system is provided. The first network node includes a memory 24 configured to store duplexing cadences. The first network node also includes a processor 26 in communication with the memory 24 and configured to select a per-band duplexing cadence for each of at least two frequency bands, a duplexing cadence defining a forward link/reverse link pattern of adjacent successive time slots. The processor 26 is further configured to allocate each of the at least two frequency bands to one of forward link and reverse link transmission in each of adjacent successive time slots according to the per-band duplexing cadence for the frequency band.

According to this aspect, in some embodiments, the first network node is a base station 14, the second network node is a wireless device 16, the forward link is a downlink and the reverse link is an uplink. In some embodiments, the first network node is a first wireless device 16, the second network node is a second wireless device 16, the forward link is a first sidelink from the first wireless device 16 to the second wireless device 16 and the reverse link is a second sidelink from the second wireless device 16 to the first wireless device 16. In some embodiments, a first frequency band of the at least two frequency bands is allocated according to a forward link to reverse link ratio of 3 to 1, a second frequency band of the at least two frequency bands is allocated according to a forward link and reverse link ratio of 2 to 1, and a third frequency band of the at least two frequency bands is allocated according to a forward link to reverse link ratio of 1 to 1. In some embodiments, each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot.

In some embodiments, each of the at least two frequency bands has a different bandwidth. In some embodiments, a first payload for the second network node 16 is transmitted on a forward link in multiple frequencies bands of the at least two frequency bands during a same time slot. In some embodiments, a first part of a payload for the second network node 16 is transmitted in a first frequency band of the at least two frequency bands in a first time slot and a second part of the payload for the second network node 16 is transmitted in a second frequency band of the at least two frequency bands in the first time slot. In some embodiments, M parts of the payload are each transmitted in a different one of M frequency bands of the at least two frequency bands during one time slot. In some embodiments, an allocation of parts of the payload among different frequency bands of the at least two frequency bands is based on channel conditions in at least one frequency band of the at least two frequency bands. In some embodiments, an allocation of parts of the payload among different frequency bands of the at least two frequency bands is based on a bandwidth of at least one frequency band of the at least two frequency bands.

In some embodiments, the processor 24 is further configured to assign a modulation and coding scheme, MCS, for a forward link transmission on a frequency band of the at least two frequency bands based on a bandwidth of the frequency band of the at least two frequency bands. In some embodiments, the processor 24 is further configured to, when a transmission of a payload to the second network node 16 in a first frequency band of the at least two frequency bands fails, resulting in a hybrid automatic repeat request, HARQ, non-acknowledgment signal from the second network node 16, re-transmit the payload in a different frequency band of the at least two frequency bands in a subsequent time slot. In some embodiments, network node-specific control information transmitted in one frequency band of the at least two frequency bands includes control information relevant to data channels of another frequency band of the at least two frequency bands.

According to yet another aspect, in some embodiments, a first network node for allocating resources for reverse link transmissions from a second network node 16 and forward link transmissions to the second network node 16 in a wireless communication system is provided. The first network node includes a memory module 25, 45 configured to store duplexing cadences. The first network node also includes a duplexing cadence selector module 19, 21, configured to select a per-band duplexing cadence for each of at least two frequency bands, a duplexing cadence defining a forward link/reverse link pattern of adjacent successive time slots. The first network node also includes a frequency band allocator module 31, 51 configured to allocate each of the at least two frequency bands to one of forward link and reverse link transmission in each of adjacent successive time slots according to the per-band duplexing cadence for the frequency band.

| Abbreviation | Explanation |
| --- | --- |
| CSI | Channel State Information |
| DMRS | Demodulation Reference Signals |
| FDD | Frequency Division Duplex |
| FSS | Frequency Selective Scheduling |
| HARQ | Hybrid Automatic Repeat Request |
| MCS | Modulation and Coding Scheme |
| RBS | Radio Base Station |
| SRS | Sounding Reference Signals |
| TB | Transport Block |
| TBS | Transport Block Size |
| TDD | Time Division Duplex |
| TM | Transmission Mode |
| TTI | Transmission Time Interval |
| UE | User Equipment |
| WD | Wireless Device |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first network node for allocating resources for reverse link transmissions from a second network node and forward link transmissions to the second network node in a wireless communication system, the method comprising:
    selecting a per-band duplexing cadence for each of at least two frequency bands, a duplexing cadence defining a forward link/reverse link pattern of adjacent successive time slots;
    allocating each of the at least two frequency bands to one of forward link and reverse link transmission in each of adjacent successive time slots according to the per-band duplexing cadence for the frequency band; and
    a first part of a payload for the second network node being transmitted in a first frequency band of the at least two frequency bands in a first time slot and a second part of the payload for the second network node being transmitted in a second frequency band of the at least two frequency bands in the first time slot.

2. The method of claim 1, wherein the first network node is a base station, the second network node is a wireless device, the forward link is a downlink and the reverse link is an uplink.

3. The method of claim 1, wherein the first network node is a first wireless device, the second network node is a second wireless device, the forward link is a first sidelink from the first wireless device to the second wireless device and the reverse link is a second sidelink from the second wireless device to the first wireless device.

4. The method of claim 1, wherein a first frequency band of the at least two frequency bands is allocated according to a forward link to reverse link ratio of 3 to 1, a second frequency band of the at least two frequency bands is allocated according to a forward link to reverse link ratio of 2 to 1, and a third frequency band of the at least two frequency bands is allocated according to a forward link to reverse link ratio of 1 to 1.

5. The method of claim 1, wherein each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot.

6. The method of claim 1, wherein each of the at least two frequency bands has a different bandwidth.

7. The method of claim 1, wherein M parts of the payload are each transmitted in a different one of M frequency bands of the at least two frequency bands during one time slot.

8. The method of claim 7, wherein an allocation of parts of the payload among different frequency bands of the at least two frequency bands is based on a bandwidth of at least one frequency band of the at least two frequency bands.

9. The method of claim 1, further comprising assigning a modulation and coding scheme, MCS, for a forward link transmission on a frequency band of the at least two frequency bands based on a bandwidth of the frequency band of the at least two frequency bands.

10. The method of claim 1, further comprising when a transmission of a payload to the second network node in a first frequency band of the at least two frequency bands fails, resulting in a hybrid automatic repeat request, HARQ, non-acknowledgment signal from the second network node, re-transmitting the payload in a different frequency band of the at least two frequency bands in a subsequent time slot.

11. The method of claim 1, wherein network node-specific control information transmitted in one frequency band of the at least two frequency bands includes control information relevant to data channels of another frequency band of the at least two frequency bands.

12. A first network node for allocating resources for reverse link transmissions from a second network node and forward link transmissions to the second network node in a wireless communication system, the first network node comprising:
a memory configured to store duplexing cadences; and
a processor in communication with the memory, the processor configured to:
select a per-band duplexing cadence for each of at least two frequency bands, a duplexing cadence defining a forward link/reverse link pattern of adjacent successive time slots;
allocate each of the at least two frequency bands to one of forward link and reverse link transmission in each of adjacent successive time slots according to the per-band duplexing cadence for the frequency band; and
a first part of a payload for the second network node being transmitted in a first frequency band of the at least two frequency bands in a first time slot and a second part of the payload for the second network node being transmitted in a second frequency band of the at least two frequency bands in the first time slot.

13. The first network node of claim 12, wherein the first network node is a base station, the second network node is a wireless device, the forward link is a downlink and the reverse link is an uplink.

14. The first network node of claim 12, wherein the first network node is a first wireless device, the second network node is a second wireless device, the forward link is a first sidelink from the first wireless device to the second wireless device and the reverse link is a second sidelink from the second wireless device to the first wireless device.

15. The first network node of claim 12, wherein a first frequency band of the at least two frequency bands is allocated according to a forward link to reverse link ratio of 3 to 1, a second frequency band of the at least two frequency bands is allocated according to a forward link and reverse link ratio of 2 to 1, and a third frequency band of the at least two frequency bands is allocated according to a forward link to reverse link ratio of 1 to 1.

16. The first network node of claim 12, wherein each of at least two of the at least two frequency bands are both allocated according to a forward link to reverse link ratio of 2 to 1, and wherein the per-band duplexing cadence of one of the two frequency bands of the at least two frequency bands is offset from the per-band duplexing cadence of the other of the two frequency bands by one time slot.

17. The first network node of claim 12, wherein each of the at least two frequency bands has a different bandwidth.

18. The first network node of claim 12, wherein M parts of the payload are each transmitted in a different one of M frequency bands of the at least two frequency bands during one time slot.

19. The first network node of claim 12, wherein an allocation of parts of the payload among different frequency bands of the at least two frequency bands is based on channel conditions in at least one frequency band of the at least two frequency bands.

20. The first network node of claim 12, further comprising assigning a modulation and coding scheme, MCS, for a forward link transmission on a frequency band of the at least two frequency bands based on a bandwidth of the frequency band of the at least two frequency bands.

21. The first network node of claim 12, further comprising when a transmission of a payload to the second network node in a first frequency band of the at least two frequency bands fails, resulting in a hybrid automatic repeat request, HARQ, non-acknowledgment signal from the second network node, re-transmitting the payload in a different frequency band of the at least two frequency bands in a subsequent time slot.

22. The first network node of claim 12, wherein network node-specific control information transmitted in one frequency band of the at least two frequency bands includes control information relevant to data channels of another frequency band of the at least two frequency bands.

* * * * *